Nov. 25, 1952     J. A. DONDERO ET AL     2,619,115
SPRING BIASED RELIEF VALVE
Filed March 22, 1947
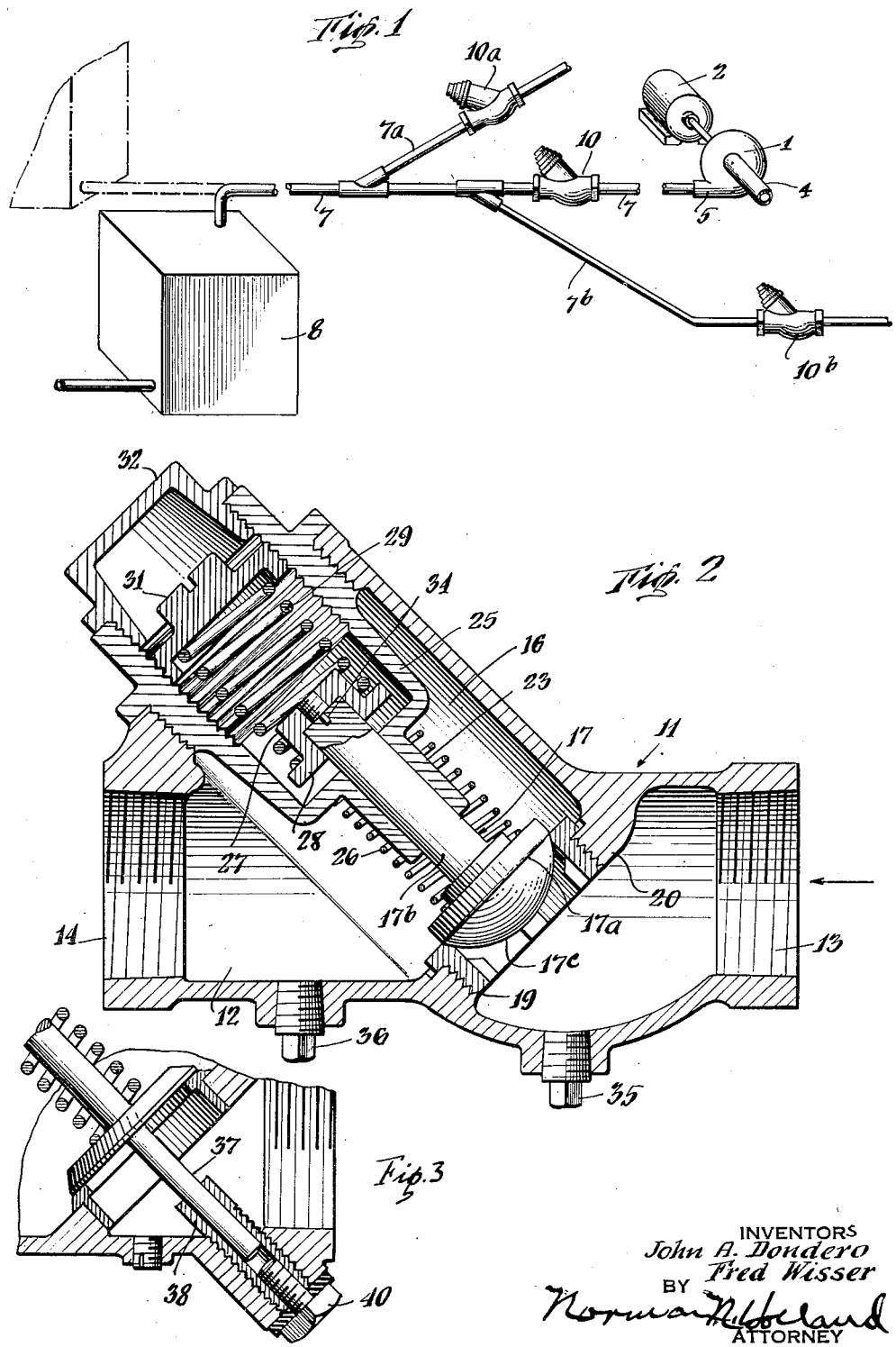
INVENTORS
John A. Dondero
Fred Wisser
BY
Norman N. Holland
ATTORNEY Patented Nov. 25, 1952

2,619,115

UNITED STATES PATENT OFFICE 2,619,115

SPRING BIASED RELIEF VALVE

John A. Dondero and Fred Wisser,
New York, N. Y.

Application March 22, 1947, Serial No. 736,545

4 Claims. (Cl. 137—529)

The present invention relates generally to apparatus for pumping fluids and more particularly to a fluid pumping apparatus and device adapted to maintain a pump actuating means running at substantially uniform electrical loading conditions.

In connection with the pumping of fluids through conduits, it is frequently desirable to move the fluids by means of a centrifugal pump, the pump being driven by an electric motor. Such pumps are adapted to handle large quantities of fluid efficiently and economically and to operate over long periods of time with minimum maintenance and upkeep.

In numerous installations the centrifugal pump is driven by an electric motor; these motors may be of various types, such as compound wound, squirrel cage, shunt, etc. So long as the pressure head or load at the outlet or discharge side of a conduit connected with the centrifugal pump remains at approximately the given value for which the motor and pump combination is designed to operate, the motor performance will generally be satisfactory. If, however, the load or pressure head at the discharge side of the pump varies, the electrical loading on the driving motor may vary widely. If, for example, the load decreases or falls off, the effective load on the motor is lessened, and as a result the electrical load of motor increases.

Electric motors have been electrically protected from danger of excessive overloading of the motor by limiting the amperage going to the motor, by fuses in the leads connected with the motor, etc. With devices of such nature it is generally necessary to reset the device, to replace a fuse, or to otherwise perform some act which requires the attendance and skill of an operator.

With many piping or distribution systems, the outlet side of the pump delivers to a conduit leading to a receiver of widely varying head or pressure, and hence the pump and its driving means are subjected to different load conditions, with resultant relatively wide load variation of the driving means in those instances where substantially constant speed electric motors are utilized. In some cases the outlet side of a conduit or distribution system may extend downwardly into a tank and in many such cases there is little load at the outlet side of the pump and on the motor, and unless close watch is kept on the motor it is likely to "overload" to such an extent as to actuate an electrical overload protective device. In other instances the discharge side of the pump may connect with a tank which is subjected to varying pressure heads due to frequent withdrawal of liquid or other fluid from the tank; here again, if the pressure head or load should decrease to a considerable extent the load will be largely removed from the pump and its driving motor and the latter will overload excessively.

The present invention aims to minimize or overcome the above-mentioned and other disadvantages or difficulties by providing a new and improved fluid pumping apparatus and device adapted to minimize excessive electrical overloading of a motor which drives a pump. The invention further contemplates the provision of means adapted to maintain a substantially constant effective load condition at the outlet side of a fluid pump.

An object of the present invention is to provide new and improved fluid pumping apparatus.

Another object of the invention is to provide a new and improved fluid pumping apparatus adapted to maintain a substantially constant load range at the delivery or outlet side of a fluid pump.

Another object of the invention is to provide a new and improved fluid pumping apparatus adapted to maintain a substantially constant load range at the delivery or outlet side of a fluid pump in instances where various pumps discharge into a common piping system and thus tend to create varying pressures in a conduit.

Still another object of the present invention is to provide a new and improved valve for use in a fluid pumping apparatus.

A still further object of the invention is to provide a new and improved combination check and constant loading valve.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a diagrammatic view illustrating one form of the present invention;

Fig. 2 is a sectional view showing a preferred form of valve used with the apparatus of Fig. 1; and Fig. 3 is a fragmentary sectional view illustrating a guide for the valve of Fig. 2.

Referring more particularly to Fig. 1 of the drawing, there is shown an apparatus or combination comprising a centrifugal pump 1 connected with and driven by an electric motor 2. Fluid from a suitable source of supply (not shown) is adapted to be transmitted to the pump 1 by a conduit 4 adjacent the center thereof and to be discharged from the pump by a conduit 5 at a peripheral location thereof. The outlet or delivery side of the centrifugal pump discharges into an additional conduit or pipeline 7, shown connected at its extremity with a low level receiving tank 8. The extremity of the conduit may be connected with any suitable type of tank at any other level, such for example as that shown by dot and dash lines at the left side of Fig. 1. Any desired additional member of conduits, valves and pumps with their respective driving motors may be connected into the piping system and the pumps with their motors may be located at different elevations. Fig. 1 shows additional conduits 7a and 7b and valves 10a and 10b connected to deliver to a receiving tank.

Connected in the conduit 7 intermediate the pump 1 and the receiving tank 8 is shown a control valve 10, shown generally in Fig. 1 and in greater detail in Fig. 2 of the drawings. This valve 10 co-operates with fluids in the conduit 7 to maintain desirable loads on the delivery side of the pump 1 and hence on the driving motor 2. The construction of the valve 10 will now be described, as an understanding of it will facilitate comprehension of its co-operation with the apparatus or combination shown in Fig. 1, of which it forms a part.

The valve illustrated in detail in Fig. 2 comprises a body or housing 11 having an opening or passage 12 therethrough, the inlet and outlet portion 13 and 14, respectively, being preferably provided with threaded connections adjacent the ends. While the housing 11 is shown with screw thread connections adjacent the ends for joining it with conduits, it may in some cases be desired to omit the screw thread connections and to rely solely upon a silver solder connection for joining it with a conduit. An angularly divergent passage or chamber 16 is adapted to contain an operating mechanism which serves to maintain a valve proper or closure member 17 upon a valve seat 19 carried within the body or housing member 11. Forming the closure member 17 and seat 19 of bronze has proven satisfactory in actual usage and utilizing substantially a parabolic curve 17c at the inlet side of the valve promotes smooth flow of fluid through the valve.

The valve seat 19 which is adapted to co-operate with the closure member 17 in sealing off the valve to the passage of fluid therethrough is preferably in the form of a separate insert threaded or otherwise secured with a suitable spider or bridge wall 20 and the valve disc 17a of the closure member 17 seats against it adjacent the periphery of the valve disc; the valve stem 17b projects through and is guided by a tubular extension 23 of a spring housing or casing member 25. The housing extension 23 with the aperture therethrough facilitates correct guiding and seating of the valve disc 17a against the separate valve seating ring or insert 19.

Intermediate the valve disc 17a and the exterior of the spring casing or housing 25, there is preferably provided a light spring 26 which assists in maintaining the closure member or valve disc 17a seated against the complementary ringlike seat 19.

The upper end of the valve stem 17b preferably carries a relatively loose fitting button or cap 27 having a flanged edge 28 forming a seat for supporting a second heavier spring 29 disposed within the spring casing or housing 25. The latter spring is shown bearing at its upper end against an adjustable cap 31 screw threaded into the spring casing or housing 25 and is preferably a much heavier spring than the first mentioned spring 26; the force exerted by the spring 29 against the closure member 17 may be varied by adjusting the position of the cap member 31. When the cap is screwed well into the spring casing 25, the upper spring 29 is adapted to exert a relatively large force upon the closure member 17; this effective closing force may be decreased by rotating the cap 31 to shift the position thereof outwardly with respect to the spring casing 25. Fluid normally finds its way into the spring casing 25 and the interior thereof is subjected to approximately the same pressure as exists at its exterior adjacent the valve 17.

A protective cap or button 32 is preferably threaded into the upper end of the spring casing or housing 25 and serves to keep dirt out of the housing and to minimize the possibility of tampering with a particular setting of the valve spring 29.

When fluid pressure is exerted on the valve disc 17a in a direction tending to lift the disc from the annular seat 19, the effect of the relatively light lower spring 26 is readily overcome and the valve commences to move upwardly in opposition to this spring. The force initially exerted by the comparatively heavier upper valve spring 29 is relatively small. When the pressure effective at the inlet side of the valve 17 becomes greater than the pressure at the outlet side, and as the force of fluid passing through the valve housing from the inlet side 13 to the outlet side 14 thereof increases, the closure member 17 is forced further off its seat 19 and the upper spring becomes increasingly effective in opposition to upward movement of the closure member; the springs become increasingly effective as the closure member continues to move upwardly. The differential pressure between the pressures at the inlet and outlet sides of the valve 16 controls, within limits, the position of the closure member 17 and hence the size of opening through the valve housing.

A preferable adjustment of the upper spring 29 is such that under most conditions of operation passage of fluid through the valve housing from the inlet to the outlet side thereof is sufficient to lift the valve disc 17 from its seat 19 in opposition to the lower light spring 26 and to initial stages of the heavier spring 29; the fluid passes through the housing 11 under the influence of the centrifugal pump 1 and its driving motor 2. This condition continues so long as the pressure head or load condition in a tank 8 connected with the outlet side of the valve housing remains substantially constant. In the event the pressure head at the outlet side of the valve drops off, either gradually or abruptly, there occurs a difference in pressure between the inlet and outlet sides of the valve and the greater pressure effective at the inlet side tends to open wider the closure member 17 so that more fluid may pass to the outlet side of the valve. As a result of the wider opening the pump 1 and its driving motor 2 tend to electrically overload the motor and make up the deficiency at the outlet side. However, the heavy upper spring 29 becomes increasingly effective as the closure 17 tends to open wider and thus the upper spring 29 prevents opening of the closure 17 so wide as to allow the motor 2 to electrically overload.

In the event a greater pressure should suddenly become effective at the discharge side of the valve than at the inlet side thereof fluid will tend to flow backward through the valve in reverse direction. The upper and lower springs then promptly seat the valve disc firmly upon its seat and effectively seal off undesirable backflow. Thus the valve serves to operate both as a check valve and as what may be termed a flow control valve.

Correct adjustment of the spring cap 31 and setting or "calibration" of the relatively heavy spring 29 carried within the spring housing or casing 25 may be made by operating the electric driving motor 2 so as to rotate the centrifugal pump 1, simultaneously observing the R. P. M. of the motor or the ammeter reading of an instrument connected with the motor, and at the same time adjusting the cap 31 so that the spring 29 automatically applies a superior or overpowering resistance sufficient to maintain the current at the rated amperage of the motor, or at a desired value.

The spring 29 prevents the closure member 17 from opening so wide as to allow the motor 2 to become "overloaded." Different valves of the same size may thus readily be set to handle a variety of different motor load conditions without requiring different parts or valves for every differing condition.

Preferably the upper spring 29 setting is such that it allows the valve proper 17 to maintain an optimum open position at all varying pressures without allowing the motor to become electrically overloaded even in the event of zero pressure or partial vacuum condition on the discharge side of the piping system. This means that the pump and motor continue to operate and supply fluid to a tank 8 and that the valve system tends to prevent a driving motor from being subjected to any sustained electric overload condition. The valve 10 thus directly controls the motor electrical loading and hence directly prevents or minimizes electrical overloading of the motor.

In instances of water hammer the closure member or valve proper 17 quickly closes and prevents the impact of water rebounding along the conduit toward the pump 1.

The upper end of the valve stem 17b is preferably provided with a transverse slot 34 so that a screw driver or some other suitable tool may be inserted to facilitate regrinding the complementary surfaces of the valve and its seat. Preferably test plugs 35 and 36 are provided in the lower part of the valve housing at each side of the bridge seat 20 to facilitate conducting tests on the valve during actual operation and also for use in removal of grinding compound in connection with reseating of the surfaces of the valve proper and its seat.

In Fig. 3 there is illustrated a feature which may be used with the valve of Figs. 1 and 2. In this figure the lower part of the valve disc is shown connected with a disc guide rod 37 adapted to fit into and be guided by a sleeve or tubular guide 38 provided with a screw cap 40 at the outer end thereof. This disc guide 37 at the lower part of the valve is particularly desirable in large sizes of valves as it tends to facilitate correct movement of the valve disc and seating thereof against a valve seat.

It will be seen that the present invention provides a new and improved apparatus or combination and also a new and improved type of combined check and flow control valve that may be utilized to efficiently, effectively and directly control the load imposed upon a motor. The direct control features pointed out hereinabove obviate the necessity of providing relatively complicated electrical mechanisms or other intermediate devices for controlling the electrical loading of a motor and, where electrical devices are used to limit the maximum loading of a driving motor, the present valve is preferably set to limit the motor electrical overload prior to the electrical devices becoming effective. The apparatus or combination is readily adapted to incorporation in existing fluid pumping system and may be used to the control of fluids of either a liquid or gaseous nature.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A device of the class described comprising the combination of a body member having a passageway therethrough and a seat for a closure member, a closure member in said body member movable toward and away from said seat to close and open said passageway, a plurality of springs within said body member and in tandem arrangement with respect to each other and each adapted to urge said closure member toward closed position against said seat, one of said springs being of heavier capacity than the other, a normally fixed abutment supporting an end of a lower and lighter capacity one of said springs, and selectively settable means supporting an end of an upper and heavier capacity one of said springs for varying the force exerted thereby independently of said lower spring.

2. A device of the class described comprising, a body member having a fluid-conducting passageway therethrough encircled by a valve seat and having a compartment angularly disposed to said passageway, a housing member within said compartment and almost entirely enclosed by portions of the body member having a wall forming an enlarged upwardly facing substantially cup-shaped chamber, said wall being provided adjacent its upper exterior portion with a screw thread engaging said housing member and at its interior with another screw thread, a valve member normally resting against said valve seat having a stem terminating within said enlarged upwardly facing chamber and adjacent the bottom thereof, a spring wholly within said enlarged chamber for pressing the terminal end of said stem downwardly and the valve toward said seat, and an imperforate cap member disposed wholly within said enlarged chamber covering the upper end of said spring and the terminal end of said stem and spaced from said terminal end, said cap being threadedly engaged with and adjustable along said interiorly threaded enlarged chamber wall to vary the force exerted by said spring against said terminal end of the valve stem.

3. A device as claimed in claim 2, in which said enlarged housing member has a reduced diameter sleeve-like portion at its lower end adapted to guide movement of said valve stem and serve as centering means for an additional spring.

4. A device as claimed in claim 2, in which said cap member has a recess for centering one end of said spring, and a spring seating member with a reduced central portion rests against the terminal end of the valve stem and supports and centers the other end of said spring.

JOHN A. DONDERO.
FRED WISSER.

REFERENCES CITED

The following references are of record in the file of this patent:

UNITED STATES PATENTS

| Number | Name | Date |
| --- | --- | --- |
| 84,586 | Shackleton | Dec. 1, 1868 |
| 512,142 | Wood | Jan. 2, 1894 |
| 716,864 | Casey | Dec. 30, 1902 |
| 862,714 | Constantinov | Aug. 6, 1907 |
| 1,050,048 | Zimmer | Jan. 7, 1913 |
| 1,155,525 | Spencer | Oct. 5, 1915 |
| 1,156,613 | Moss | Oct. 12, 1915 |
| 1,467,004 | Landers | Sept. 4, 1923 |
| 1,703,243 | Rothenbucher | Feb. 26, 1926 |
| 1,742,755 | Cataline | Jan. 7, 1930 |
| 1,775,480 | Arutunoff | Sept. 9, 1930 |
| 1,780,782 | Holmes | Nov. 4, 1930 |
| 1,792,248 | Schmidt | Feb. 10, 1931 |
| 1,910,949 | Germeyer | May 23, 1933 |
| 2,166,530 | Morgan | July 18, 1939 |
| 2,174,153 | Dorer | Sept. 26, 1939 |

FOREIGN PATENTS

| Number | Country | Date |
| --- | --- | --- |
| 508,002 | France | of 1920 |